(12) United States Patent
Bruck

(10) Patent No.: US 9,839,980 B2
(45) Date of Patent: Dec. 12, 2017

(54) METHODS OF BRAZING WIDE GAPS IN NICKEL BASE SUPERALLOYS WITHOUT SUBSTANTIAL DEGRADATION OF PROPERTIES

(71) Applicant: Siemens Energy, Inc., Orlando, FL (US)

(72) Inventor: Gerald J. Bruck, Myrtle Beach, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/098,389

(22) Filed: Apr. 14, 2016

(65) Prior Publication Data

US 2017/0297147 A1 Oct. 19, 2017

(51) Int. Cl.
*B23K 1/00* (2006.01)
*B23K 35/30* (2006.01)
*C22C 19/05* (2006.01)

(52) U.S. Cl.
CPC .......... *B23K 35/304* (2013.01); *B23K 1/0018* (2013.01); *C22C 19/055* (2013.01)

(58) Field of Classification Search
CPC .............. B23K 35/3033; B23K 1/0018; B23K 2201/001; B23K 35/30; B23K 1/0012; C22C 1/0433; C22C 45/04
USPC ........... 228/119, 262.31, 245, 56.3; 403/272; 420/441, 442
See application file for complete search history.

(56) References Cited

U.S. PATENT DOCUMENTS

| | | | |
|---|---|---|---|
| 5,156,321 A * | 10/1992 | Liburdi | B22F 7/062 228/119 |
| 6,520,401 B1 | 2/2003 | Miglietti | |
| 7,156,280 B1 | 1/2007 | Jiang et al. | |
| 8,197,747 B2 | 6/2012 | Huang | |
| 2007/0175546 A1 | 8/2007 | Hoppe et al. | |
| 2009/0068446 A1 | 3/2009 | Bischof et al. | |
| 2010/0038412 A1 | 2/2010 | Huang | |
| 2010/0189555 A1 * | 7/2010 | Quinn | F01D 5/288 415/200 |
| 2015/0308449 A1 | 10/2015 | Bareiss | |

FOREIGN PATENT DOCUMENTS

| | | |
|---|---|---|
| EP | 0800889 A1 | 10/1997 |
| EP | 2193874 A1 | 9/2008 |

OTHER PUBLICATIONS

Buschke, I. et al., New Approaches for Joining High-Temperature Materials, Proceedings from Materials Conference 98 on Joining of Advanced and Specialty Materials, Oct. 12-15, 1998, Rosemont, Illinois, pp. 51-55, ASM International®, Materials Park, Ohio.
Corrosion Resistant Hastelloy Alloy at a Glance, Hastelloy® D-205™ alloy, Haynes International Preliminary Data Sheet, h-2103, Aug. 1993, 2 pages, 1993, Haynes International, Inc., Kokomo, IN.
Everhart, John L., Engineering Properties of Nickel and Nickel Alloys, pp. 56-57, Plenum Press, New York-London, 1971.
Haynes Hastelloy® D-205 Corrosion Resistant Alloy, 2 pages, Copyright 1996-2015 by MatWeb, LLC; accessed via: http://www.matweb.com/search/datasheet.aspx?matguid=e2b57ba023734618ad18494c4aaaa186&ckck=1 on Dec. 24, 2015, 11:34 AM.
Haynes Hastelloy® D-205 Corrosion Resistant Alloy, 2 pages, Copyright 1996-2015 by MatWeb, LLC; accessed via: http://www.matweb.com/search/datasheettext.aspx?matid=16786 on Dec. 24, 2015, 11:34 AM.
High-Temperature High-Strength Nickel Base Alloys, Including 1995 Supplement, 1995, 76 pages, 393/08, Nickel Development Institute, courtesy of Inco Limited; accessed via: https://nickelinstitute.org/~/media/Files/TechnicalLiterature/High_TemperatureHigh_StrengthNickel_BaseAlloys_393_.ashx.
Laux, Britta et al., Fast Epitaxial High Temperature Brazing of Single Crystalline Nickel Based Superalloys, Journal of Engineering for Gas Turbines and Power, May 2009, vol. 131, pp. 032102-1-032102-8, Technische Universität Braunschweig, Institut für Werkstoffe, 38106 Braunschweig, Germany; Downloaded From: http://gasturbinespower.asmedigitalcollection.asme.org/ on Jan. 4, 2016.
Materials of Construction—Metals-Alloy D-205, Sulphuric Acid on the Web™, Mar. 12, 2003, 2 pages, © 2005-2011 DKL Engineering, Inc., http://www.sulphuric-acid.com/techmanual/materials/materials_metals_d205.htm on Dec. 24, 2015, 11:36AM.
Mortland, J.E. et al., Welding and Brazing of Nickel and Nickel-Base Alloys a Report, 1972, 87 Pages (p. 66 missing), Prepared under contract NASw-1842 by Battelle Memorial Institute Columbus Laboratories, Columbus, Ohio 43201, Technology Utilization Office, National Aeronautics and Space Administration, Washington, D.C.
Ni—Cr: "Computation of Ni—Cr Phase Diagram via a Combined First-Principles Quantum Mechanical and CALPHAD Approach," K. S. Chan, Y-M. Pan, Y-D. Lee, Metallurgical and Materials Transactions A, vol. 37A, Jul. 2006, Fig. 1 @ p. 2038.
Ni—Si: "The Ni—Si (Nickel-Sillicon) System," by P. Nash and A. Nash, Bulletin of Alloy Phase Diagrams, vol. 8, No. 1, pp. 6-7 (1987).

(Continued)

*Primary Examiner* — Erin B Saad

(57) ABSTRACT

Nickel base superalloys, including in some embodiments 5% to 7% Fe, which were previously developed and used for their corrosion resistance, also possess favorable characteristics for use as a braze filler in repair or joining of superalloy substrates, such as those used to form turbine engine blades and vanes, heat exchangers, vessels, and piping. In particular, such corrosion-resistant nickel base superalloys have favorable characteristics for wide-gap brazing of gaps greater than one millimeter in superalloy substrates that preserves favorable material properties throughout the braze region in the substrate.

6 Claims, 2 Drawing Sheets

(56) References Cited

OTHER PUBLICATIONS

Super Alloy Hastelloy (r) D-205™, 3 pages, Date Added: Oct. 22, 2012 | Updated: Jun. 11, 2013, Limited Copyright 2000-2015, AZoM.com—An AZoNetwork Site; accessed via: http://www.azom.com/article.aspx?ArticleID=7662 on Dec. 24, 2015, 11:35AM.

\* cited by examiner

METHODS OF BRAZING WIDE GAPS IN NICKEL BASE SUPERALLOYS WITHOUT SUBSTANTIAL DEGRADATION OF PROPERTIES

TECHNICAL FIELD

The invention relates generally to the fabrication or repair of metals, alloys and superalloys. More particularly the invention relates to the brazing of nickel base superalloys and most particularly to the brazing of wide gaps in nickel base superalloys using brazing alloy materials and procedures that do not result in substantial degradation of properties in the region of the braze.

BACKGROUND

The embodiments described herein relate generally to the fabrication, repair, or both, of metals, alloys and superalloys, such as those used in construction of turbine engine diffusers, blades and vanes, heat exchangers, corrosion-resistant vessels and piping, among other component applications. For economy of expression, we refer to all such component-forming materials as "alloys", where it is clear from context which material or materials are intended. It is often necessary in the fabrication or repair of such alloys to join two pieces of alloy, to repair a crack, or to fill a void, gap or hollow in the alloy. For economy of language, we refer to all such activities as "repair" or "repairing of the alloy." Although brazing generally involves the brazing of a single type of alloy as the base material that forms the component's substrate (also referred to as the base metal, base alloy or base superalloy), brazing techniques are not inherently limited to a single composition of base material, nor are the embodiments described herein so limited. As is known in the field, dissimilar alloys are often joined by brazing. The range of compositions of the brazing materials described herein permits routine experimentation to learn whether particular dissimilar alloys under consideration can be joined. For economy of language, we describe herein brazing a single type of alloy which forms the component substrate, understanding thereby that joining of dissimilar alloys is not inherently excluded as could be determined by routine testing.

Common methods for repairing alloys include welding with or without added filler material, brazing and soldering. Welding involves melting a region of the base material whereas brazing and soldering involve melting only the filler material but generally not melting the surrounding alloy. Braze filler material is referred to herein as braze filler, braze filler material, braze material or braze alloy interchangeably and without distinction. It is conventional to identify as "brazing" processes in which the liquidus temperature of the filler material is typically above about 450 degrees Celsius, (842 degrees F.) but below the solidus temperature of the base metal substrate. We follow conventional terminology in which the liquidus temperature denotes the boundary between an all-liquid phase and a phase containing both solid and liquid, and solidus denotes the boundary between an all-solid phase and a phase containing both liquid and solid. Soldering relates to the use of filler materials that melt below about 450 deg. C. The chief focus herein relates to brazing.

Joining by brazing of flat or complimentary surfaces (such as the opposing walls of shaped pieces or the opposing faces of some cracks) can often be accomplished with only a thin layer of brazing material between the surfaces to be joined, typically less than about 1 mm, often about 0.1 mm in thickness. Such a thin braze joint generally takes on properties similar to those of the surrounding base alloy. That is, the mechanical properties, the corrosion resistance, the high temperature performance as well as other properties of such a thin braze joint is typically not markedly different from that of the surrounding base alloy substrate. For example, such nearly matching properties might be obtained by short range diffusion brazing often using braze filler materials with the same composition as the base metal, modified only by the addition of small amounts of a melting point suppressant such as boron. In such cases, diffusion brazing can result in a braze filling that virtually matches the base metal composition and properties.

On the other hand, many brazing processes require braze filler material to span a gap larger (sometimes much larger) than about 1 mm, or to fill a substantial gap, void or hollow in the base alloy, hereinafter a "wide gap." In such cases, the brazed region generally takes on mechanical properties, corrosion resistance, high temperature properties and other properties similar to those of the braze material rather than the properties of the base alloy (hereafter referred to generally as "substrate properties"). Long range diffusion of melting point suppressant from such a wide gap of braze material to achieve properties substantially matching those of the base metal is not normally achievable. Thus, a significant degradation of the performance of such an alloy substrate at, and in the neighborhood of, the brazed portion is the undesirable result. Under the "weakest link" standard, the overall performance of the component including such brazed region is likely to be significantly degraded. For these reasons, brazing repair (especially for wide gaps) is generally considered a non-structural repair, that is, a repair that does not maintain the desired properties throughout the brazed region. Typical conventional braze materials generally have material structural properties significantly less than the properties of the base metal, sometimes less than about 70% of the base metal properties.

One known braze material formulation approach is to use the base material itself as the starting point for formulating a braze filler with suitable modifications to achieve an adequate brazing material. For example, a brazing process requires that the braze material melt at a lower temperature than the base material, more precisely, that the liquidus of the braze filler be less than the solidus of the base material. Thus, melting point suppressants may be added to a base material to produce a braze filler material with depressed melting point. For example, boron (B) is sometimes used to depress braze material melting points in the diffusion brazing of superalloys in an attempt to achieve near base metal properties. However, as noted by Huang (U.S. Pat. No. 8,197,747), boron tends to form brittle hard phases with other alloying elements within the joint or repaired area, thereby reducing the ductility, fatigue life and the corrosion resistance properties of the base material, within the joined or repaired region.

Nickel (Ni) base braze alloys have been proposed having low boron (B) content in an effort to avoid brittleness but with the addition of hafnium (Hf) in order to achieve desired melting point suppression (for example, see Jiang et al U.S. Pat. No. 7,156,280). Such braze materials may reduce problems of brittleness, but do not eliminate them so that further improvement would be desirable. Furthermore, such alloys often introduce other disadvantages. For example, alloys of nickel-hafnium-chromium (Ni—Hf—Cr), nickel-hafnium-cobalt (Ni—Hf—Co) and nickel-hafnium-molybdenum (Ni—Hf—Mo), all without boron, have been proposed by Buschke et al "New Approaches for Joining High-Temperature Materials," *Proceedings from Materials Conference '98 on Joining Advanced and Specialty Materials*, pp. 51-55, 12-15 Oct. 1998, Rosemont, Ill., by M. Singh, J. Indacochea, D. Hauser Eds. (Published by ASM International, Materials Park, Ohio 44073-0002). However, such alloys often have additional disadvantages. For example, such brazing alloys typically require relatively high brazing temperatures of the order of about 1235 deg. C. Furthermore, the absence of B, Si (silicon) or both from the brazing alloy can cause the alloy to exhibit poor wettability. That is, when the braze alloy is heated to or above its melting temperature, the resulting alloy typically does not effectively disperse over (or "wet") the base material surfaces to be joined.

Nickel base boron-free braze alloys have also been proposed that contain Cr, Hf, Co, Zr (zirconium), Ti (titanium) and Al (aluminum) to produce a solidus temperature of about 1175 deg. C. That is, the temperature at which the solid material begins to liquefy, but only partially liquefy, (the solidus) is about 1175 deg. C. The mechanical properties, braze wettability, among other properties that might be achievable with such alloys are not known precisely, but it is expected that such properties are not suitable for wide gap structural brazing applications and effective extension of the braze filler by capillary wetting over broad surfaces.

Boron-free braze alloys have also been proposed with very high Hf or Zr content, for example by Miglietti, U.S. Pat. No. 6,520,401. Others have been proposed with very high Mn (manganese) content, for example by Laux et al "Fast Epitaxial High Temperature Brazing of Single Crystalline Nickel Base Superalloys", *Journal of Engineering for Gas Turbines and Power, Transactions of the ASME*, Vol. 131, pp. 032102-1- 032102-8 (May 2009). However, the braze alloys proposed with very high Hf, Zr or Mn are substantially different in composition from the base alloy and, therefore, are expected to have properties quite different from those of the base alloy. Specifically nickel base alloys have been formulated without the intentional addition of Zr or with contents of Zr typically less than 0.1 weight percent. Other alloys have been formulated having Zr as high as about 1.5 weight percent for the purpose of possible grain refinement, that is to strengthen and improve ductility at grain boundaries with a view to increasing the creep-rupture strength of the material.

Thus, a need exists in the art for brazing procedures and materials that can be used for wide gap (which in some embodiments described herein is 1 mm or greater in some portion of the brazing zone) and structural repairs, without substantial degradation of the aforementioned component material properties (which in some exemplary embodiments include one or more of the properties identified in Table 2 herein), below 70% of the original base metal specifications.

DESCRIPTION OF EMBODIMENTS

Figure 1:
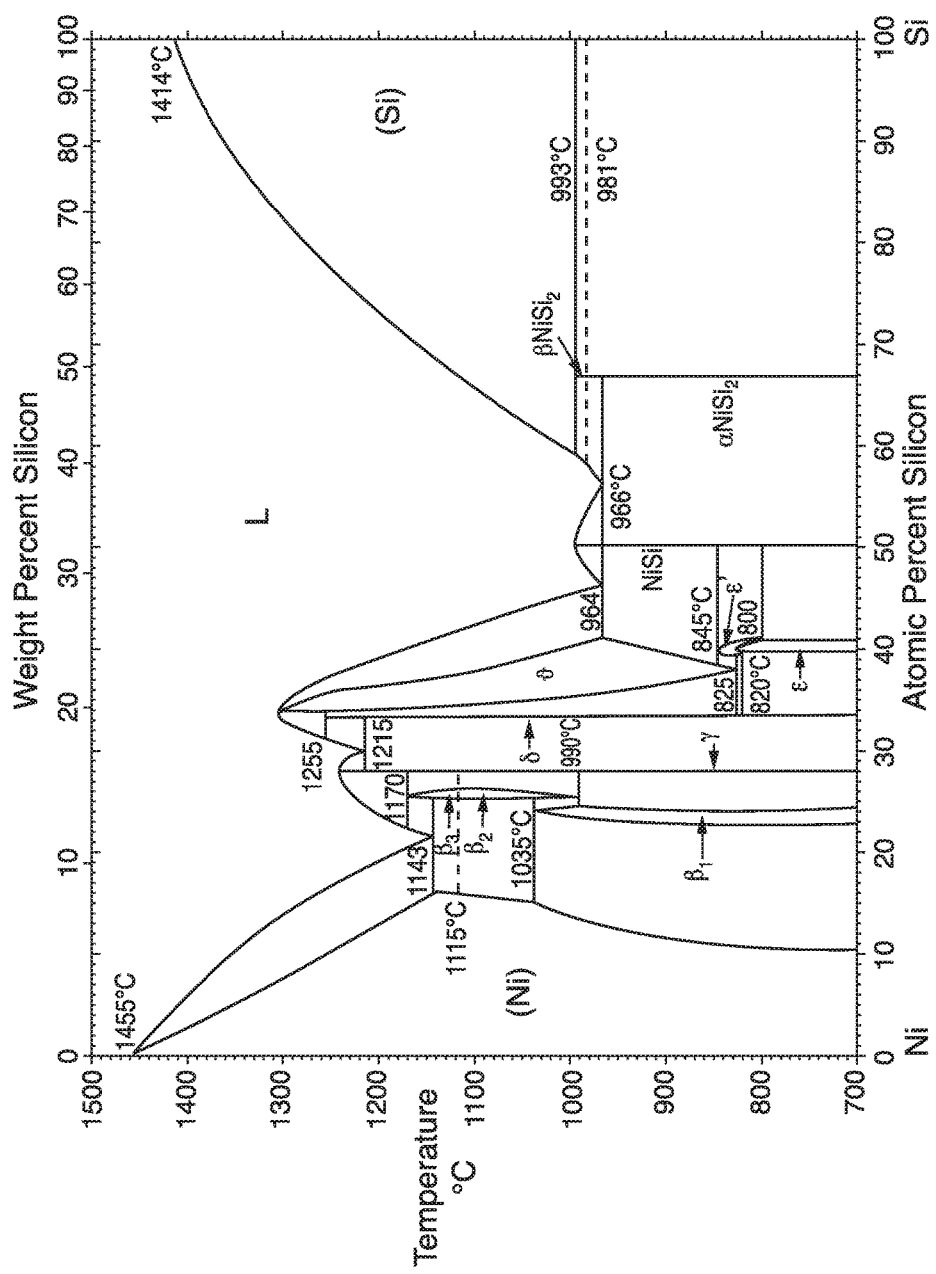
FIG. 1: (Prior Art) A binary phase diagram for the Ni—Si system. The data for which is available from numerous published sources including "The Ni—Si (Nickel-Silicon) System," by P. Nash and A. Nash, *Bulletin of Alloy Phase Diagrams*, Vol. 8, No. 1, pp. 6-7 (1987).

After considering the following description, those skilled in the art will clearly realize that the teachings of the present invention can be readily utilized in the brazing of nickel base superalloys, and more particularly in some embodiments, for the brazing of wide gaps, typically of 1 mm or greater, in nickel base superalloys used in fabrication of superalloy components. In some embodiments, the braze zone created by the methods of the present invention has 70% or greater of the aforementioned nickel base superalloy material properties, (e.g., 70% or more of the original component material mechanical and/or corrosion resistance, and/or high-temperature performance property specifications, among others). The brazing process embodiments described herein are intended to achieve material properties in the brazed region as close as possible to those of the base material, preferably 70% or above of the aforementioned base metal component's properties.

The brazing of nickel base superalloys is an important practical matter for applications in gas turbines and other high temperature environments. To be concrete in our discussion, we will focus on applications to the brazing of cast nickel (Ni) base superalloys, recognizing thereby that some of the approaches described herein will be readily applicable to other materials such as iron base superalloys, cobalt base superalloys, wrought nickel base superalloys stainless steels and dissimilar combinations including ceramics to metallic alloys, as would be apparent to one having ordinary skill in the art. Application to such varied materials is possible because brazing does not involve melting of the base metals and therefore the braze material does not dilute, alloy with, or otherwise degrade the properties of the base material when it is subsequently solidified. Physically, the molten braze filler material should wet the adjoining surfaces and flow over them, typically by capillary action. The mechanical properties of the solidified braze material should match or compliment those of the base metal(s) (or "substrate(s)") that are being repaired or joined.

We identify herein materials respectively having a favorable combination of properties for use as a braze alloy but whose basic composition was developed with quite different purposes in view. This braze alloy has not heretofore been recognized as a good candidate braze material for use with Ni base superalloys and possibly other base alloys. For example, the braze alloy identified herein has a significant amount of iron (Fe). Few if any Ni base alloys used to form components, such as turbine engine blades and vanes, have intentional levels of Fe, thus rendering the braze alloy described herein substantially different in composition from the Ni base alloy base materials. Also, the braze alloy described herein lacks a number of other elemental constituents generally regarded in the art as important for superalloy brazing, including Al, Ti and Nb (for precipitation strengthening), Co, Ta, W and Re (for solid solution strengthening) as well as Hf and B (for grain boundary strengthening).

The brazing alloy embodiments identified herein have compositions with substantially the values given in Table 1, with particularly favorable extended ranges of compositions indicated in parenthesis ( ). All percentages are weight percentages unless otherwise specified.

TABLE 1-A

| | | |
|---|---|---|
| Cr: | 20% | (20%-22%) |
| Fe (iron): | 6% | (5%-7%) |
| Si: | 5% | (5%-10%) |
| Mo (molybdenum): | 2.5% | (1.5%-10%) |
| Cu (copper): | 2% | (0.2%-2%) |
| C (carbon): | | (0%-0.03%) |
| Ni: | balance | |

In other embodiments, other elements may be advantageously combined with the preceding elements of Table 1-A, as given in Table 1-B. The elements of Table 1-B are anticipated to enhance the performance of the braze alloy by the means noted following each entry in Table 1-B.

TABLE 1-B

| | | | |
|---|---|---|---|
| Al: | 0% | (0%-3%) | (for strengthening by facilitating formation of the gamma prime phase, or "gamma prime strengthening" in short). |
| Ti: | 0% | (0%-7%) | (for gamma prime strengthening) |
| Co: | 0% | (0%-20%) | (for carbide and solid solution strengthening) |
| Ta (tantalum): | 0% | (0%-10%) | (for carbide and solid solution strengthening) |
| W (tungsten): | 0% | (0%-12%) | (for solid solution strengthening) |
| Zr: | 0% | (0%-6%) | (for solid solution and grain boundary strengthening) |
| Hf: | 0% | (0%-1.5%) | (for grain boundary strengthening) |
| B: | 0% | (0%-1.0%) | (for grain boundary strengthening) |
| Nb (niobium): | 0% | (0%-1.0%) | (for gamma double prime strengthening) |
| Re (rhenium): | 0% | (0%-0.2%) | (for solid solution strengthening) |
| Ni: | balance | | |

Applicant submits that the composition values given above would not be anticipated to be a good braze alloy for superalloy structural repair according to conventional understanding in the field. Reasons that one ordinarily skilled in the art would not have chosen the above compositions for brazing of superalloys include:

(a) Virtually all Ni base superalloys do not contain added iron.

(b) Virtually all Ni base superalloys contain constituents facilitating gamma prime formation (such as aluminum, titanium or both), or gamma double prime (such as niobium), absent from the alloys of Table 1-A.

(c) The solid solution strengtheners and grain boundary strengtheners noted above are absent in the present braze alloy of Table 1-A.

(d) The relatively high level of Si in the present braze alloy of Table 1-A would normally be expected to result in the formation of embrittlement phases during brazing. However, it is known that this alloy is weldable as described for a commercial embodiment known as Hastelloy® D-205™ in published Data Sheets, leading to the conclusion that melting and solidification of the particular compositions of Table 1-A do not lead to the precipitation of embrittling phases.

The alloys described in Table 1-A ("Table 1 alloys") include as a particular embodiment within the given ranges the commercial product Hastelloy® D-205™ (hereinafter "D-205") developed by Haynes International of Kokomo, Ind., as set forth in the alloy provider's published Data Sheets describing D-205, its properties and its potential uses.

It is recognized that D-205 is thought to be preferable to high Si—Fe based alloys, due to its resistance to high temperature embrittlement and resistance to corrosion. In fact, as noted in the Data Sheets, one of its recommended uses is for wall material in sulfuric acid baths, although it may have been surpassed by alternate alloys in its corrosion resistant properties. It is also noted that D-205 alloy is apparently no longer commercially available.

Applicant notes that the use of Table 1 alloys, in particular alloy D-205, has not been suggested as a useful braze alloy before the disclosure contained herein. Therefore, Applicant respectfully submits that the advantages of this type of alloy as a braze alloy for Ni base superalloys have not been recognized before, and thus the disclosure herein is a new and novel use for a known material. Applicant further submits that, for the reasons given in (a)-(d) above, prior teachings in the art teach away from using the presently disclosed alloys for brazing Ni base superalloys, thereby rendering the present descriptions an unexpected and surprising result.

Table 1 alloys have useful attributes for employment as a braze alloy. We cite specific data for alloy D-205 as a representative example of Table 1 alloys since these data are readily available in public sources. As a braze alloy, D-205 has several interesting and useful attributes not heretofore recognized. While the melting range (or single melting temperature if the composition is a eutectic) of D-205 has apparently not been reported, we can reasonably estimate the melting temperature from a similar "sister" alloy known as Hastelloy D. Hastelloy D is also a high silicon, nickel base alloy including copper (Ni-82% Si-9% Cu-3% omitting other elemental constituents) as given, for example, in *Engineering Properties of Nickel and Nickel Alloys*, John Everhart (Ed.), Springer Science+Business Media, New York (1971), p. 56. The reported melting temperature range of Hastelloy D is 1110 to 1120 deg. C. (2030 to 2048 deg, F) (see above reference by Everhart).

Figure 2:
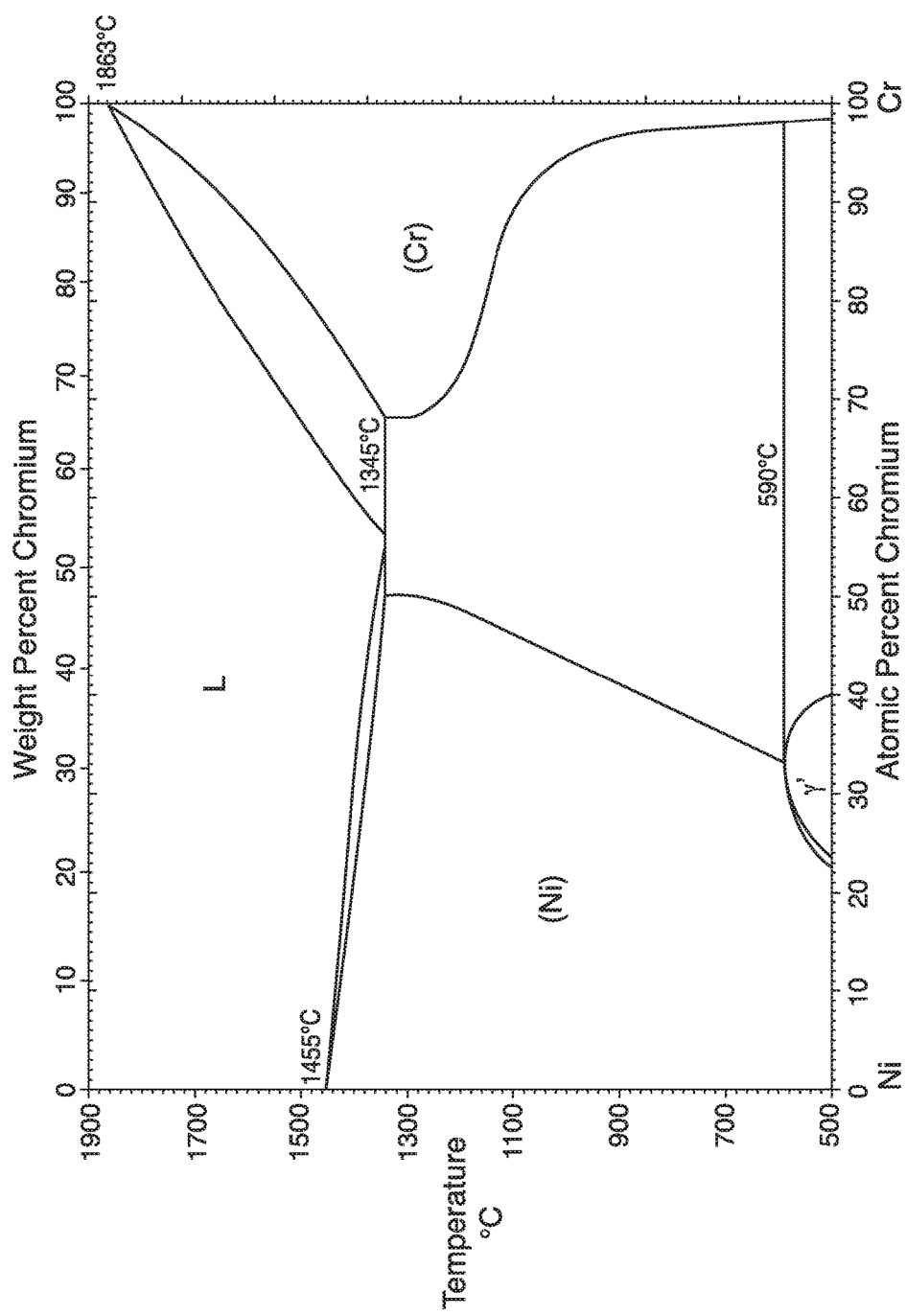
FIG. 2: (Prior Art) A binary phase diagram for the Ni—Cr system. The experimental results are available from numerous published sources including "Computation of Ni—Cr Phase Diagram via a Combined First-Principles Quantum Mechanical and CALPHAD Approach," K. S. Chan, Y-M. Pan, Y-D. Lee, *Metallurgical and Materials Transactions A*, Vol. 37A, July 2006, FIG. 1 @ p. 2038.

Binary phase diagrams, such as FIG. 1 and FIG. 2 herein, suggest that the higher Cr content of D-205 vs. Hastelloy D (20% versus 0%) would further suppress the melting temperature but that the lower silicon content (5% versus 9%) would increase the melting temperature. A net increase in melting temperature of perhaps as much as about 60 deg. C. would still afford the D-205 alloy a reasonably low melting temperature range (estimated to be about 1170 deg. C. to about 1180 deg. C.) and not eliminate its potential advantages as a braze alloy. It is partly for these reasons that, for the braze alloys described herein, chromium is chosen to be a minimum of 20%, at the low end of its range, and silicon is chosen to be a minimum of 5%, both at the low end of their respective ranges. Another favorable attribute of chromium is that it provides corrosion/oxidation resistance. Another favorable attribute of silicon is that it provides good fluidity and wetting. However these minima are expected to provide a reasonably low braze temperature without significantly degrading other advantageous properties contributed by these and other components.

The expected low melting temperature range of D-205 indicates that reasonable braze temperatures can be used for brazing superalloys. D-205 has excellent ductility of about 56% elongation (as mill annealed). Such ductility indicates that D-205 can easily be drawn into wire, strip, foil or other desired shapes as conveniently used for braze filler, among other uses. The high Cr content of D-205 suggests that it has good resistance to oxidation. Its high Si content suggests that it has good wettability properties. Furthermore, as indicated in the Data Sheets, D-205 can be age-hardened to provide good mechanical properties. Table 2 compares the properties of two typical superalloys, Mar M 247 and IN 738 with D-205 after age-hardening.

TABLE 2

| Property | Mar M 247 | IN 738 | D-205 (age hardened) |
|---|---|---|---|
| Ultimate Tensile Strength | 965 MPa (102%) | 1095 MPa (89%) | 980 MPa |
| Yield Strength | 815 MPa (88%) | 950 MPa (76%) | 718 MPa |
| Elongation | 7% | NA | 29% |

The numbers in parenthesis give the percentage of that property provided by D-205, for example (76%) = (718 MPa)/(950 MPa).
MPa (MegaPascals of Pressure).
1 MPa = 145 psi.

Data in Table 2 was extracted from a publication "High Temperature, High Strength, Nickel Base Alloys, No. 393," including 1995 supplement, by the Nickel Development Institute, www.nickelinstitute.org It is clear from Table 2 that D-205 typically provides greater than about 70% of the tensile strength and yield strength of both alloys Mar M 247 and IN 738 and ductility (as measured by elongation) far superior to that of the Mar M 247. Applicant is not aware of any teaching or indication prior to the present disclosure that shows that Table 1 alloys in general, or D-205 in particular, would be good brazing alloys for use with Ni base superalloys. The comparable (greater than 70%) properties of the cited braze alloy compared to superalloys such as Mar M 247 and IN 738 is thought to result primarily from copper rich precipitate strengthening following age hardening. The mechanism is similar to such strengthening reported in copper-containing precipitate hardened stainless steels such as 17-4 PH. Solid solution strengthening (from e.g. Cr, Fe and Mo) may also contribute to the braze alloy's outstanding performance.

The range of compositions substantially similar to the composition of D-205, as given in Table 1, is expected to provide performance substantially similar to that of D-205. D-205 was formulated to provide a high level of corrosion resistance, as stated by the manufacturer of D-205 in the Data Sheets. It is expected that modest adjustments to the compositions of D-205, with a view to improving properties other than corrosion resistance, will likewise provide good performance as a braze alloy. For example, adjustment of the amount of Si, or the addition of Hf could further refine the wettability properties of the braze alloy and modify the alloy's melting point. Also, the addition of Al, Ti or Nb as noted in Table 1B would be expected to provide strengthening of the alloy by the formation of gamma prime or gamma double prime phases (or both), thereby providing improved mechanical properties at elevated temperatures.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

What is claimed is:

1. A method of brazing a gap in a Ni base superalloy substrate consisting essentially of:
   providing a braze alloy having substantially the following composition in weight percent:
   Cr: 20%-22%; and,
   Fe: 5%-7%; and,
   Si: 5%-10%; and,
   Mo: 1.5%-10%; and,
   Cu: 0.2%-2%; and,
   C: 0%-0.03%; and, optionally, one or more of;
   Al: greater than 0% and less than approximately 3%; and,
   Ti: greater than 0% and less than approximately 7%; and,
   Hf: greater than 0% and less than approximately 1.5%; and,
   Nb: greater than 0% and less than approximately 1%; and,
   Zr: greater than 0% and less than approximately 6%; and,
   B: greater than 0% and less than approximately 1%; and,
   the balance of the braze alloy is Ni; and,
   delivering the braze alloy to a gap in the substrate, wherein the gap is too wide for diffusion brazing; and
   brazing the gap having the braze alloy therein at a temperature that is the lower of 1180 degrees Celsius or a temperature that is above liquidus temperature of the braze alloy but below solidus temperature of the substrate; and,
   allowing the braze alloy to solidify creating thereby a braze zone.

2. A method of brazing a gap in a Ni base superalloy substrate as in claim 1 wherein the braze alloy has substantially the following composition in weight percent:
   Cr: 20%; and,
   Fe: 6%; and,
   Si: 5%; and,
   Mo: 2.5%; and,
   Cu: 2%; and,
   C: 0%-0.03%; and,
   the balance of the braze alloy is Ni.

3. A method of brazing a gap in a Ni base superalloy substrate as in claim 1 wherein the gap having brazing alloy therein is at least 1 millimeter wide in some portion of the brazing zone.

4. A method of brazing a gap in a Ni base superalloy substrate as in claim 2 wherein the gap having brazing alloy therein is at least 1 millimeter wide in some portion of the brazing zone.

5. A method of brazing a gap in a Ni base superalloy substrate as in claim 3 wherein at least one of the following properties of the braze zone is at least 70% of the corresponding property of the Ni base superalloy: ultimate tensile strength, yield strength, elongation or corrosion resistance.

6. A method of brazing a gap in a Ni base superalloy substrate as in claim 4 wherein at least one of the following properties of the braze zone is at least 70% of the corresponding property of the Ni base superalloy: ultimate tensile strength, yield strength, elongation or corrosion resistance.

* * * * *